No. 865,064. PATENTED SEPT. 3, 1907.
W. C. STATE.
COLLAPSIBLE CORE.
APPLICATION FILED DEC. 14, 1906.

Witnesses:
Edna Bortz
Glenara Fox

Inventor:
Will C. State
by C. E. Humphrey
Atty

UNITED STATES PATENT OFFICE.

WILL C. STATE, OF AKRON, OHIO, ASSIGNOR TO THE GOODYEAR TIRE AND RUBBER COMPANY, OF AKRON, OHIO, A CORPORATION OF OHIO.

COLLAPSIBLE CORE.

No. 865,064.  Specification of Letters Patent.  Patented Sept. 3, 1907.

Application filed December 14, 1906. Serial No. 347,884.

*To all whom it may concern:*

Be it known that I, WILL C. STATE, a citizen of the United States, residing at Akron, in the county of Summit and State of Ohio, have invented new and useful Improvements in Collapsible Cores, of which the following is a specification.

This invention relates to collapsible cores or mandrels for manufacturing pneumatic tires of the double-tube type having inextensible bands or edges.

In constructing the outer tubes or wear-resisting casings of pneumatic tires, an annular core or mandrel is employed on which the same is built up of rubber and fabric and during which the edges or side bands of the tire, engaged by the retaining means of the wheel rim, are so made or formed as to render them as inextensible as possible. In consequence of the fact that these edges cannot be stretched and that the tire is annularly-formed, it becomes necessary to so construct the core that it can be withdrawn from the interior of the completed tire through the opening existing along its inner or rim face.

The object of this invention therefore, is, broadly speaking, to construct a core upon which the tire may be built and which may be easily and successfully removed after the vulcanization of the tire through the opening existing in its inner face.

With the foregoing and other objects in view, the invention consists in the novel construction, combination and arrangement of parts constituting the invention to be hereinafter referred to and illustrated in the accompanying drawings which form a part of this specification in which is shown the preferred embodiment of the invention, but it is to be understood that changes, variations and modifications can be resorted to which come within the scope of the claims hereunto appended.

Figure 1:
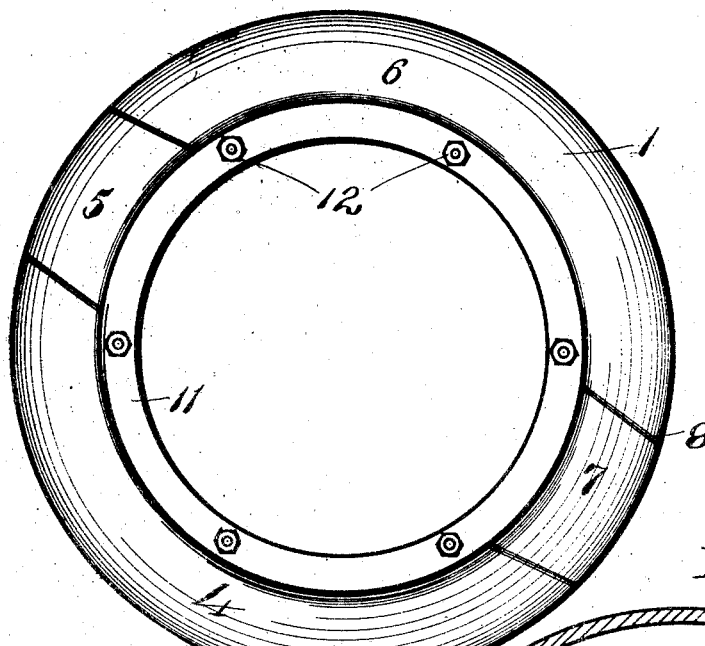
Figure 3:
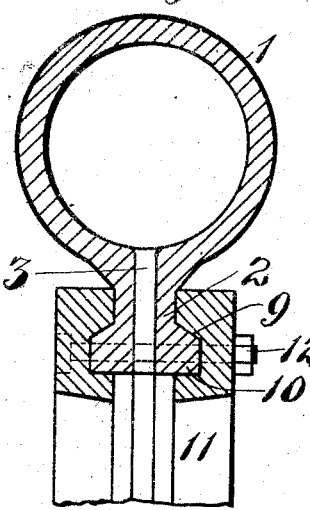
Figure 2:
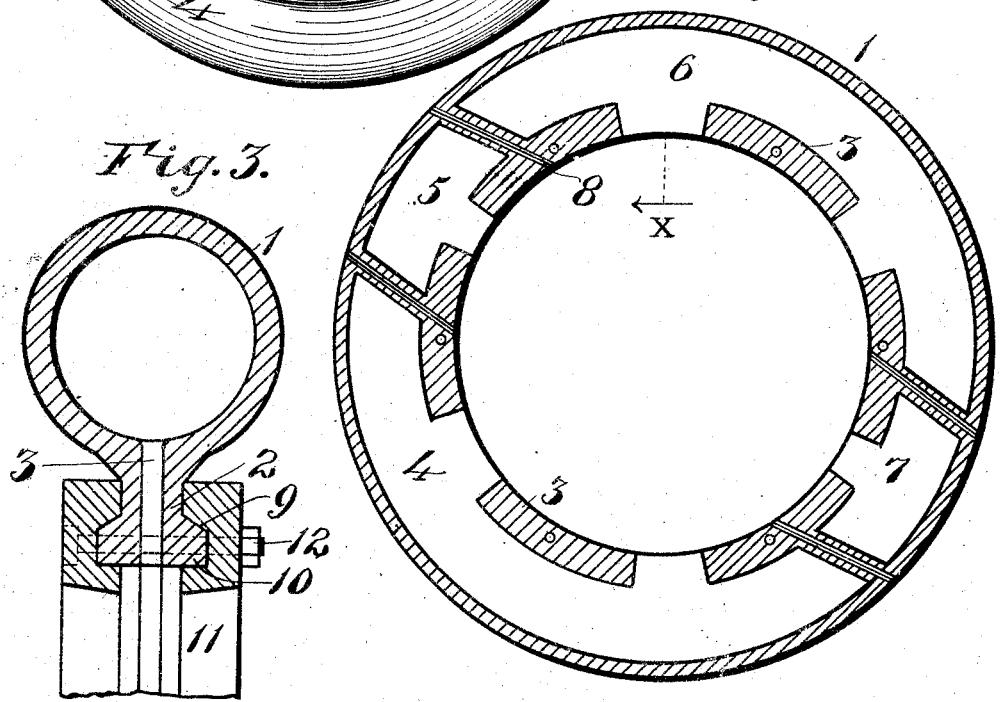

In the drawings, in which similar reference numerals indicate like parts in the different figures: Figure 1 is a side elevation of a core or mandrel embodying my invention; Fig. 2 is a longitudinal, central section of the same; and, Fig. 3 is a section on line *t* of Fig. 2.

Cores for the manufacture of outer tubes of double-tube pneumatic tires are constructed annularly, as shown in Fig. 1, of a suitable metal in a tubular form, having such an exterior conformation as it is desired to impart to the interior of the finished tire.

In the drawings, the reference numeral 1 indicates a core or mandrel provided on its inner face with projecting edges 2 separated at intervals from each other and at other portions connected together by integrally-formed lugs 3. In order to make the core collapsible, it is divided into a plurality of parts, so that the several portions thereof may be withdrawn successively through the opening along the inner, central line of the tire.

In making mandrels to be used in the manufacture of large tires, the core is preferably formed in four parts, but if the tire is a comparatively small one the core or mandrel may consist of only three parts.

In the drawings, the parts of the core are referred to by the reference numerals 4, 5, 6 and 7, all of which, when united together, constitute an annular member. The parts 5 and 7 are preferably made smaller than the portions 4 and 6. The lines of severance between the portions 5 and 7 and the balance of the core are formed oblique to the radii in such a manner that the outer or peripheral portions of the parts 5 and 7 are smaller than those portions near the center of the core, so that these portions may be withdrawn easily from the balance of the core.

I prefer to cover the abutting portions of the tire with sheets or plates of steel, referred to in the drawings by the reference numeral 8 in order to make their contact smoother and reduce the wear incident to their use. The inner projecting edges 2 of the core are formed with an inclined face 9 and the extreme inner portions, referred to by the reference numeral 10, are enlarged, constituting an annular beading about the inner portion of the core.

In order to hold the various portions of the core securely in position when a tire is being built thereon and during the vulcanizing process, I use two rings 11 identically alike and having channels cut on one of their faces of such a conformation as will engage the inclined face 9 of the core and inclose the beading 10. These rings are secured in position and clamp the various portions of the tire together firmly by means of a plurality of bolts 12 which pass through both the rings and the inner edges of the core. The openings for the reception of these bolts are preferably placed so as to pass through the lugs 3.

In using this core or mandrel the parts are placed in the position shown in Fig. 1 and a tire is built thereon of any kind desired by the manufacturer. The tire and core are then placed in a vulcanizing heat until a cure is effected; the bolts 12 are removed, which permits the removal of the rings 11. The removal of the rings 11 make it possible to draw inward the two parts 5 and 7 of the core. As soon as these two parts are removed, the two parts 4 and 6 are easily drawn out through the longitudinal opening existing in the inner portion of the tire. It will be noted that by forming the parts 5 and 7 with inclined edges where they united with the other portions 4 and 6, the removal of these other sections of the core becomes an easy matter, which might not be true were the lines of union between the various portions of the core radial to the center.

What I claim and desire to secure by Letters Patent, is:—

1. A device of the character described comprising a plurality of independent segment-shaped members disconnected from and adapted to abut against each other;

said members when in abutting engagement forming a collapsible core, and means overlapping the inner portion of said members for maintaining them in abutting engagement.

2. A device of the class described comprising a core composed of a plurality of parts, which when united will form an annular member, the lines of severance between the several parts being oblique to the radii of said member, said several parts being provided with inwardly-projecting portions constituting an annular beading, and a pair of rings adapted to clamp said beading between them whereby said members are maintained in proper relation to each other.

3. A device of the class described comprising a plurality of core members adapted when united together to form an annular body, the points of severance being oblique to the radii thereof, each of said core members being provided with inwardly-projecting edges, which when united together will form an annular beading, a pair of rings adapted to clamp said beading between them and means to clamp said rings on said beading.

4. A device of the character described comprising a plurality of independent segment-shaped members disconnected from and adapted to abut against each other, said members when in abutting engagement forming a collapsible core, and means independent of said members for maintaining them in abutting position.

In testimony whereof I have hereunto set my hand in presence of two subscribing witnesses.

WILL C. STATE.

Witnesses:
R. T. DOUGLAS.
C. E. HUMPHREY.